United States Patent
Kim et al.

(10) Patent No.: US 7,818,460 B2
(45) Date of Patent: Oct. 19, 2010

(54) HARDWARE DEVICE AND METHOD FOR TRANSMITTING NETWORK PROTOCOL PACKET

(75) Inventors: Sun-Wook Kim, Daejon (KR);
Dae-Won Kim, Daegu (KR); Youngwoo Kim, Daejon (KR); Kyoung Park, Daejon (KR); Seong-Woon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 311 days.

(21) Appl. No.: 11/949,127

(22) Filed: Dec. 3, 2007

(65) Prior Publication Data

US 2008/0130642 A1 Jun. 5, 2008

(30) Foreign Application Priority Data

Dec. 4, 2006 (KR) .................. 10-2006-0121269
Oct. 29, 2007 (KR) .................. 10-2007-0109015

(51) Int. Cl.
G06F 15/16 (2006.01)
G06F 15/173 (2006.01)

(52) U.S. Cl. .................. 709/250; 709/227; 709/230

(58) Field of Classification Search .......... 709/227, 709/230, 250
See application file for complete search history.

(56) References Cited

U.S. PATENT DOCUMENTS

| 7,089,326 | B2 | 8/2006 | Boucher et al. | |
| 7,382,802 | B2 * | 6/2008 | Kim et al. | 370/469 |
| 7,535,913 | B2 * | 5/2009 | Minami et al. | 370/401 |
| 2003/0154246 | A1 * | 8/2003 | Ollikainen | 709/203 |
| 2004/0117509 | A1 * | 6/2004 | Craft et al. | 709/250 |
| 2004/0249881 | A1 | 12/2004 | Jha et al. | |
| 2004/0249957 | A1 * | 12/2004 | Ekis et al. | 709/228 |
| 2005/0152361 | A1 * | 7/2005 | Kim et al. | 370/389 |
| 2005/0195833 | A1 | 9/2005 | Chiang et al. | |
| 2005/0198198 | A1 | 9/2005 | Craft et al. | |
| 2006/0123123 | A1 * | 6/2006 | Kim et al. | 709/227 |
| 2008/0130642 | A1 * | 6/2008 | Kim et al. | 370/389 |

FOREIGN PATENT DOCUMENTS

| JP | 2005-316629 A | 11/2005 |
| KR | 1020010076328 | 8/2001 |
| KR | 1020060064511 A | 6/2006 |
| KR | 10-0653178 B1 | 11/2006 |

\* cited by examiner

*Primary Examiner*—Ajay Bhatia
(74) *Attorney, Agent, or Firm*—Ladas & Parry LLP

(57) ABSTRACT

Provided are a hardware device and method for transmitting a network protocol packet in a TOE for network protocol acceleration. The hardware device includes: a socket resource control and TCP connection/release command unit for storing socket resource control commands, and TCP connection/release commands from a host processor; a message transmission command storing unit for storing message transmission commands based on network protocol corresponding to each socket; a socket information and packet transmission information storing unit for storing socket information and packet transmission information; and a transmission-only processor for checking necessary transmission resources by interpreting message transmission commands stored in the message transmission command storing unit, processing a message to be transmitted in a form of a network packet, reading data to be transmitted, creating a header, and storing socket information and packet transmission information in the socket information and packet transmission information storing unit.

20 Claims, 5 Drawing Sheets

HARDWARE DEVICE AND METHOD FOR TRANSMITTING NETWORK PROTOCOL PACKET

CROSS-REFERENCES TO RELATED APPLICATIONS

The present invention claims priority of Korean Patent Application Nos. 10-2006-0121269 and 10-2007-0109015, filed on Dec. 4, 2006, and Oct. 29, 2007, respectively, which are incorporated herein by reference.

BACKGROUND OF THE INVENTION

1. Field of the Invention

The present invention relates to a hardware device and method for transmitting a network protocol packet in a Transmission Control Protocol (TCP) Offload Engine (TOE) for network protocol acceleration; and, more particularly, to a hardware device and method for transmitting a network protocol packet using a dedicated hardware device mounted in a TCP offload engine (TOE) or a firmware in a transmission-only processor in a hardware manner, thereby reducing a system load that increases by processing the requests of packet transmission generated by a plurality of network application programs in a computer system.

This work was supported by the Information Technology (IT) research and development program of the Korean Ministry of Information and Communication (MIC) and the Korean Institute for Information Technology Advancement (IITA) [2005-S-405-02, "A Development of the Next Generation Internet Server Technology"].

2. Description of Related Art

In general, systems connected through a network have the relation of a server and a client. Here, a network program may be used for the server and the client to communicate with each other. The network program transmits and receives data through a socket, which is a communication access point in software manner, on a network.

When data is transmitted through the socket, a header and data of a network protocol packet stored in a memory are transferred to a transmission buffer of a network interface through a bus, and transmitted to the network through a controller. When data is received through the socket, the header and data of the network protocol packet is transmitted to a memory through a receiving buffer.

Such processes are performed by an operating system through an application program. In order to transmit data, the operating system generates a socket buffer for storing transmission data based on a socket generation routine of an application program. When the operating system receives a data transmission command, corresponding data is copied into a socket buffer of an operating system kernel. Here, the operating system forms a packet with the data stored in the socket buffer and transmits the formed packet after copying the header and the data thereof in the network interface.

As described above, in a conventional network program, the network protocol packet is transmitted based on a network protocol stack of the operating system. That is, the packet transmission is processed in software manner.

If the number of data transmission using network protocol increases caused by executing numbers of network application programs in a computer system, a lot of system load occurs in order to process the network protocol, to thereby degrade an overall system performance.

SUMMARY OF THE INVENTION

An embodiment of the present invention is directed to providing a hardware device and method for transmitting a network protocol packet using a dedicated hardware device mounted in a TCP offload engine (TOE) or a firmware in a transmission-only processor in a hardware manner, thereby reducing a system load that increases caused by processing the requests of packet transmission generated by numbers of network application programs in a system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a hardware device for transmitting a network protocol packet, including: a socket resource control and TCP connection/release command unit for storing socket resource control commands, and TCP connection/release commands from a host processor; a message transmission command storing unit for storing message transmission commands based on network protocol corresponding to each socket; a socket information and packet transmission information storing unit for storing socket information and packet transmission information; and a transmission-only processor for checking necessary transmission resources by interpreting message transmission commands stored in the message transmission command storing unit, processing a message to be transmitted in a form of a network packet, reading data to be transmitted, creating a header, and storing socket information and packet transmission information in the socket information and packet transmission information storing unit.

In accordance with another aspect of the present invention, there is provided a method for transmitting a network protocol packet including: confirming necessary transmission resources by interpreting message transmission commands stored in a message transmission command pool; forming a message to be transmitted in a form of a network packet based on a corresponding network protocol; reading data to be transmitted and creating a network protocol header for transmitting the data; and transmitting a packet formed based on the created header and the read data.

DESCRIPTION OF SPECIFIC EMBODIMENTS

The advantages, features and aspects of the invention will become apparent from the following description of the embodiments with reference to the accompanying drawings, which is set forth hereinafter.

In the present invention, a transmission firmware means a transport network protocol stack that is driven in a transmission-only processor in a TCP offload engine (TOE) for network protocol acceleration. The transmission firmware receives and processes a message transmission request, a socket related to transmission, and a management command for managing other network resources from an application program. The transmission firmware also receives and processes initial setup and control command of TOE.

Figure 1:
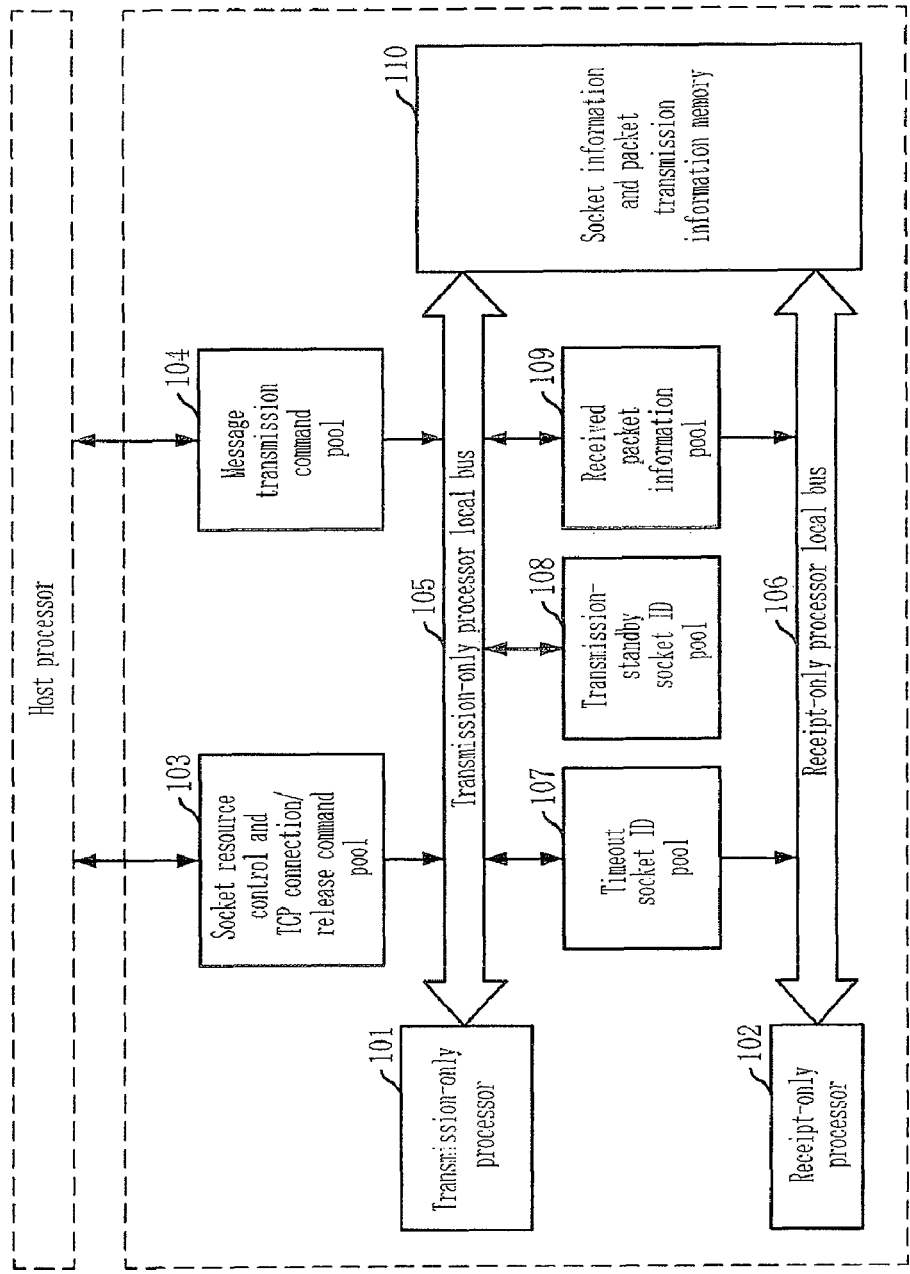
FIG. 1 is a hardware device for transmitting a network protocol packet based on TOE in accordance with an embodiment of the present invention.

FIG. 1 is a hardware device for transmitting a network protocol packet based on TOE in accordance with an embodiment of the present invention.

A network protocol is processed by a transmission-only processor 101 and a receipt-only processor 102 separately. The transmission-only processor 101 receives and processes a socket resource control command, a TCP connection/release command and a message transmission command. The receipt-only processor 102 receives a message receipt command and a network packet from an external device. An internal memory 110 of the hardware device stores socket information and packet transmission information.

As shown in FIG. 1, a hardware device based on TOE for transmitting network protocol packet in accordance with the present embodiment includes a transmission-only processor 101, a receipt-only processor 102, a socket resource control and TCP connection/release command pool 103, a message transmission command pool 104, a timeout socket ID pool 107, a transmission-standby socket ID pool 108, a received packet information pool 109, and a socket information and packet transmission information memory 110.

The transmission-only processor 101 processes a network transport protocol based on TOE. The receipt-only processor 102 processes network receiving protocol based on TOE. The socket resource control and TCP connection/release command pool 103 stores the socket resource control (create, delete, property change) commands from a host processor. The message transmission command pool 104 stores message transmission commands based on the network protocol corresponding to each socket. The transmission-standby socket ID pool 108 stores the ID of a socket that waits for transmission because the socket does not have the information for transmitting a message (data) and a TCP connection/release packet (command) The timeout socket ID pool 107 stores an ID of a socket having a timeout packet. The timeout packet is generated when a packet is transmitted or received. The received packet information pool 109 stores network packet information that is generated by the receipt-only processor 102. The socket information and packet transmission information memory 110 stores socket information and packet transmission information according to the control of the transmission-only processor 101.

Here, the host processor operates a network protocol stack on an operating system and transfers a socket resource control command, a TCP connection/release command, and a message transmission command (data transmission command) from a network application program to a hardware device.

The socket resource control and TCP connection/release command pool 103, the message transmission command pool 104, and the transmission-standby socket ID pool 108 are connected to the transmission-only processor 101 through the transmission-only processor local bus 105.

Also, the timeout socket ID pool 107, the received packet information pool 109, and the socket information and packet transmission information memory 110 are connected to the transmission-only processor 101 through the transmission-only processor local bus 105 and connected to the receipt-only processor 102 through a receipt-only processor local bus 106.

Figure 2:
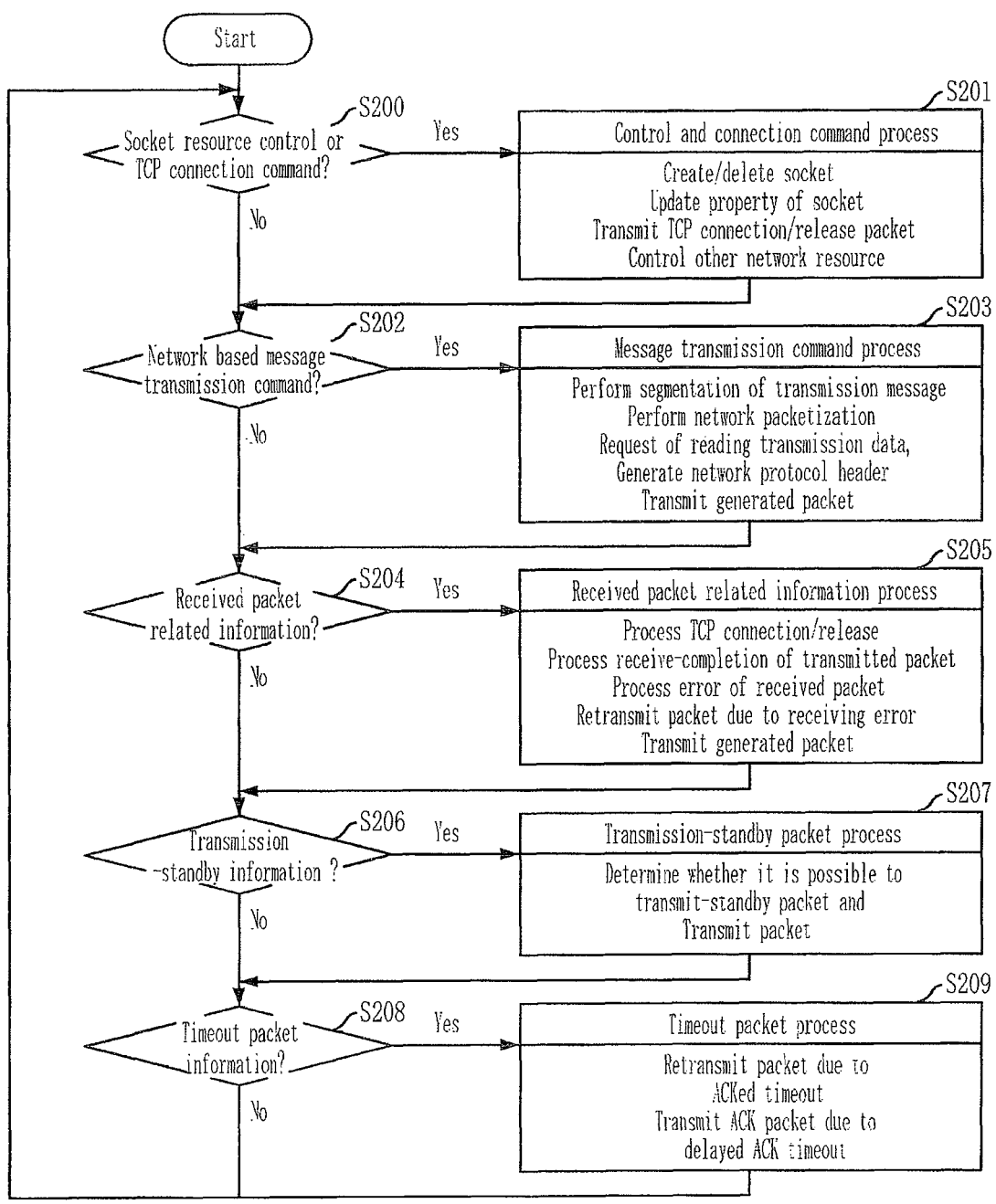
FIG. 2 is a flowchart of a method for transmitting a network protocol packet based on TOE in accordance with an embodiment of the present invention.

FIG. 2 is a flowchart illustrating a method for transmitting a network protocol packet based on TOE in accordance with an embodiment of the present invention. That is, FIG. 2 shows operations of a transmission firmware executed in a transmission-only processor 101.

As shown in FIG. 2, the operation of the transmission firmware for transmitting a network protocol packet is divided into five processes as follows.

The first process receives and processes a socket resource control command and a TCP connection/release command, which are generated by a request from a network program. The second process receives and processes message transmission command based on the network protocol. The third process receives and processes information that is generated as a result of processing a packet received from the outside by the receipt-only processor 102. The fourth process processes packets that wait for being transmitted because no transmission information is provided. The fifth process processes a timeout packet which is generated when a packet is transmitted or received.

Hereinafter, the five processes of the transmission firmware will be described.

<Socket Resource Control and TCP Connection/Release Command Process>

At first, the transmission-only processor 101 determines whether or not socket resource control (create, delete, property change) commands or TCP connection/release commands, which are received from a host processor, are stored in the socket resource control and TCP connection/release command pool 103 at step S200.

If the socket resource control commands or the TCP connection/release commands are stored in the socket resource control and TCP connection/release command pool 103 at step S200, corresponding commands are interpreted and processed at step S201. Here, the socket resource control and TCP connection/release command pool 103 further includes network resource control commands.

Figure 3:
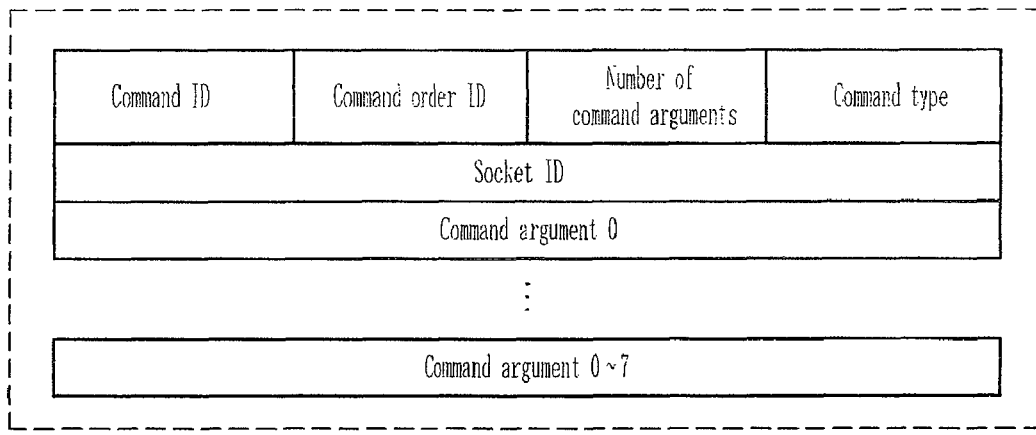
FIG. 3 is a diagram illustrating a socket resource control and TCP connection/release command stored in a socket resource control and TCP connection/release command pool in accordance with an embodiment of the present invention.

As shown in FIG. 3, the socket resource control command or the TCP connection/release command includes a command identification (ID) field, a command order ID field, a field for the number of command arguments, a command type field, a socket ID field, and command argument fields.

If the socket resource control commands or the TCP connection/release commands are not stored in the socket resource control and TCP connection/release command pool 103 at step S200, the step S202 is performed.

<Message Transmission Command Process>

The transmission-only processor 101 determines whether or not the message transmission commands based on the network protocol corresponding to each socket are stored in the message transmission command pool 104 at step S202.

If the message transmission commands are stored in the message transmission command pool 104 at step S202, a corresponding command is analyzed and processed at step S203.

That is, the transmission-only processor 101 checks necessary transmission resources by interpreting the stored message transmission command by performing segmentation of a message.

Then, the segmented message to be transmitted is processed in a form of a network packet based on a corresponding network protocol.

Data to be transmitted is read, and a network protocol header is created for transmitting the data.

Then, a formed packet which is composed of the the created header and the read data is transmitted.

Figure 4:
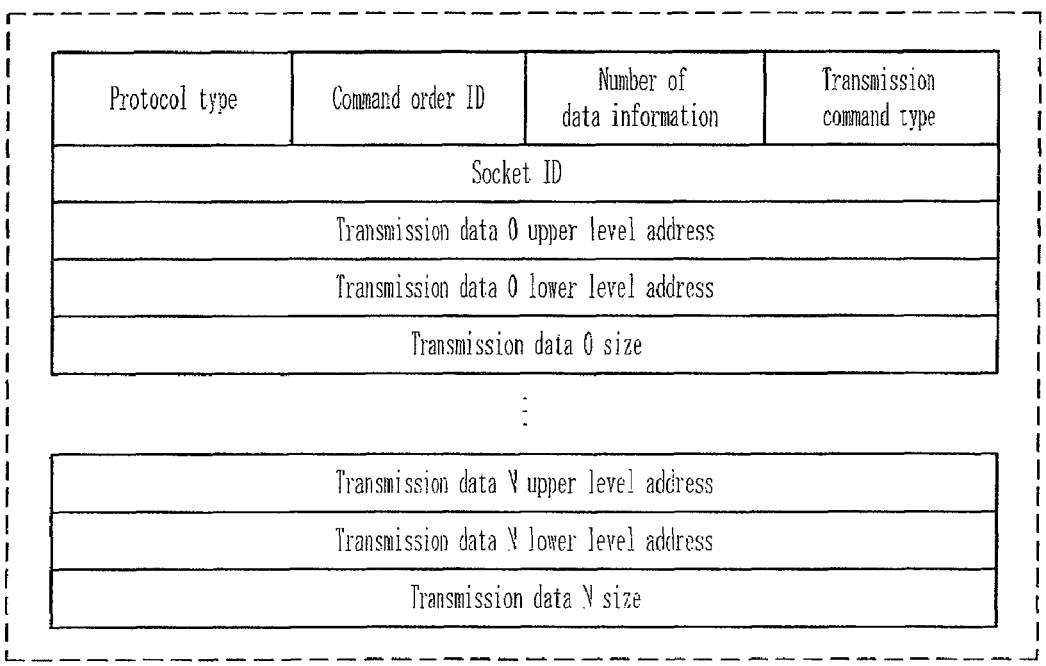
FIG. 4 is a diagram illustrating a message transmission command stored in a message transmission command pool in accordance with an embodiment of the present invention.

As shown in FIG. 4, the message transmission command includes a protocol type field, a command order ID field, a field on the number of data information, a transmission command type field, a socket ID field, and at least of a transmission data upper level address field, a transmission data lower level address field, and a transmission data size field.

If the message transmission commands are not stored in the message transmission command pool 104 at step S202, the step S204 is performed.

<Received Packet Related Information Process>

The transmission-only processor 101 determines whether or not network packet information is stored in a received packet information pool 109 at step S204.

If the network packet information is stored in the received packet information pool 109 at step S204, corresponding information is interpreted and processed at step S205. Here, the network packet information includes TCP connection/release information, receive-completion information of a transmission packet, and error information of a received packet. Therefore, the transmission-only processor 101 processes TCP connection/release information, the receive-completion information of a transmission packet, the error information of a received packet, and the retransmission of the packet due to a receipt error.

Figure 5:
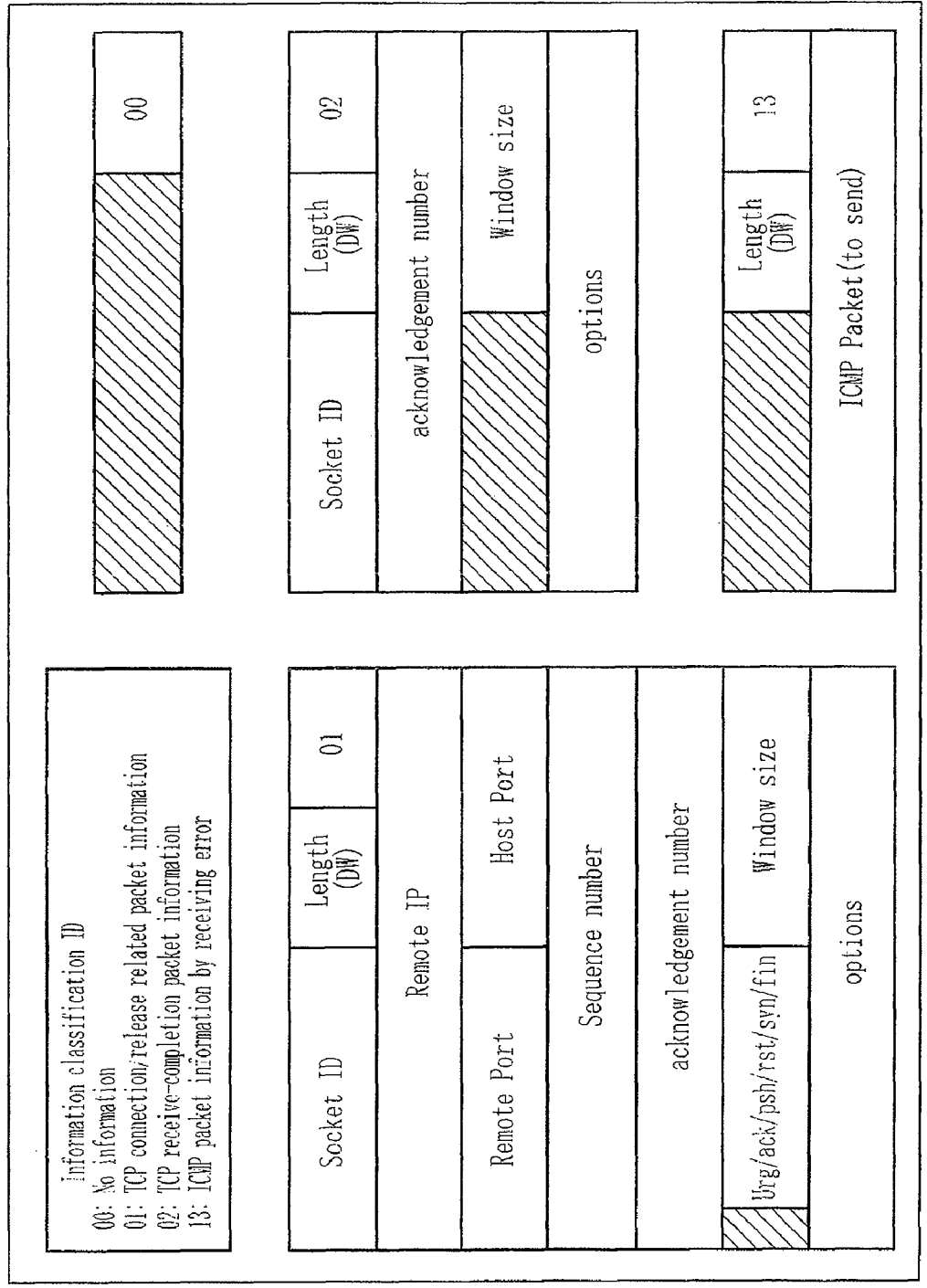
FIG. 5 is a diagram illustrating network packet information stored in a received packet information pool in accordance with an embodiment of the present invention.

FIG. 5 shows the network packet information which is the information of processing a packet received by the receipt-only processor 102.

If the network packet information is not stored in the received packet information pool 109 at step S204, the step S206 is performed.

<Transmission-Standby Information Process>

The transmission-only processor 101 determines whether or not an ID of a socket that waits for transmission is stored in the transmission-standby socket ID pool 108 at step S206. The reason of waiting transmission is that there is no information for message (data) transmission and TCP connection/release packet (command) transmission.

That is, when transmitting an acknowledgment (ACK) packet for a received packet and a data packet for a message transmission command generated as a request of a network program, the transmission-only processor 101 delays to transmit the ACK packet and data packet until a media access control (MAC) address of a corresponding destination node is obtained if the MAC address of the corresponding node does not exist. Then, the transmission-only processor 101 stores an ID of a corresponding socket in the transmission-standby socket ID pool 108.

If the socket ID waiting for transmission is stored at step S206, a MAC address of a destination node is obtained through transmitting and receiving an address resolution protocol (ARP) packet. Then, a corresponding packet is transmitted at step S207.

The steps S206 and S207 are identically performed when retransmission is tried.

Figure 6:
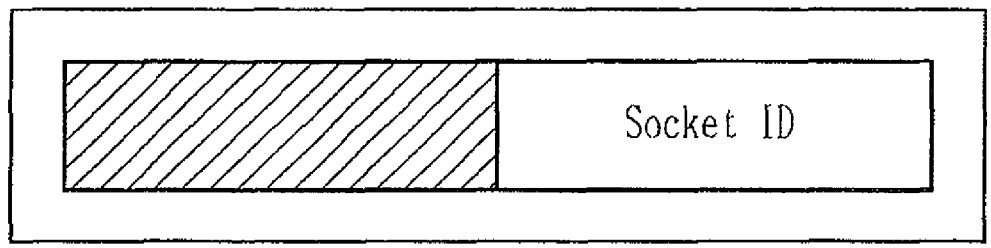
FIG. 6 is a diagram illustrating a socket ID stored in a transmission socket ID pool in accordance with an embodiment of the present invention.

FIG. 6 illustrating the structure of a socket ID.

If the socket ID is not stored at step S206, the step S208 is performed.

<Timeout Socket ID Information Process>

At first, the transmission-only processor 101 sets a timeout time (ACKed Timeout) for receiving an ACK packet from a target node after a TCP packet is transmitted. And the receipt-only processor 102 sets a timeout time (Delayed ACK timeout) for transmitting a receive-completion packet of a received TCP packet.

When a corresponding timeout time expired by a hardware logic that controls the timeout, a timeout type and an ID of a corresponding socket are transferred and stored in the timeout socket ID pool 107.

The transmission-only processor 101 determines whether or not an ID of a socket having a timeout packet is stored in a socket ID pool 107 at step S208.

If the ID of a socket having the timeout packet is stored at step S208, a timeout type is confirmed, and a corresponding packet is transmitted at step S209.

If the ID of a socket having the timeout packet is not stored at the step S208, the step S200 is performed again.

Figure 7:
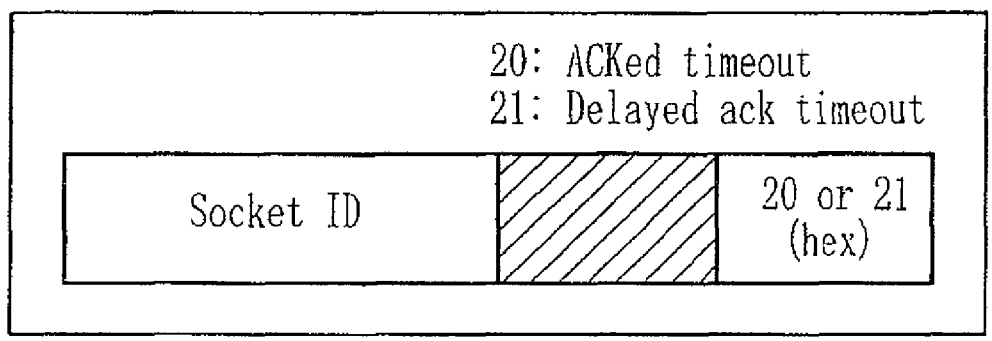
FIG. 7 is a diagram illustrating a timeout type and a socket ID structure stored in a timeout socket ID pool in accordance with an embodiment of the present invention.

Here, FIG. 7 illustrates the structure of the timeout type and the socket ID.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the hardware device and method for transmitting a network protocol packet in accordance with the present invention process data transmission in a hardware manner through a firmware driven in a transmission-only processor and a dedicated hardware device embedded in a TCP offload Engine (TOE), unlike the conventional device and method that process data transmission by a network protocol stack in a software manner. Therefore, it reduces a system load generated in order to process the packet transmission requests that increase due to the execution of a plurality of network application programs in a system.

While the present invention has been described with respect to certain preferred embodiments, it will be apparent to those skilled in the art that various changes and modifications may be made without departing from the spirits and scope of the invention as defined in the following claims.

What is claimed is:

1. A hardware device for transmitting a network protocol packet, comprising:

a socket resource control and transmission control protocol (TCP) connection/release command storing means for storing socket resource control commands and TCP connection/release commands from a host processor;

a message transmission command storing means for storing message transmission commands based on network protocol corresponding to each socket;

a socket information and packet transmission information storing means for storing socket information and packet transmission information;

a timeout socket ID storing means for storing an ID of a socket having a timeout packet that is generated when a packet is transmitted and received;

a receiving packet information storing means for storing network packet information;

a transmission-only processor coupled to a transmission-only processor local bus such that the transmission-only processor communicates with the socket resource control and transmission control protocol (TCP) connection/release command storing means, with the message transmission command storing means, with the socket information and packet transmission information storing means, with the timeout socket ID storing means, and with the receiving packet information storing means, wherein the transmission-only processor for checking necessary transmission resources by interpreting message transmission commands stored in the message transmission command storing means, processing a message to be transmitted in a form of a network packet, reading data to be transmitted, creating a header, and storing socket information and packet transmission information in the socket information and packet transmission information storing means;

a receipt-only processor coupled to a receipt-only processor local bus such that the receipt-only processor communicates with the timeout socket ID storing means, with the receiving packet information storing means, and with the socket information and packet transmission information storing means; and a received packet information pool for storing network packet information.

2. The hardware device of claim 1, further comprising a transmission-standby socket ID storing means coupled to the transmission-only processor local bus such that the transmission-standby socket ID storing means communicates with the transmission-only processor, wherein the transmission-standby socket ID storing means for storing an identification (ID) of a socket having no media access control (MAC) address for transmitting the message transmission command and the TCP connection/release command, wherein the transmission-only processor obtains a MAC address of a destination node through transmitting and receiving an address resolution protocol (ARP) packet if the transmission-standby socket ID storing means includes a socket ID and transmits a corresponding command which is a packet.

3. The hardware device of claim 2, wherein the transmission-only processor sets a timeout time, confirms a timeout type if an ID of a socket is stored in the timeout socket ID storing means by a hardware logic controlling a timeout, and transmits a corresponding packet.

4. The hardware device of claim 3, wherein the receiving packet information storing means for storing network packet information that is generated by the receipt-only processor, wherein the transmission-only processor analyzes and processes corresponding information if the received packet information storing means includes network packet information.

5. The hardware device of claim 4, wherein the network packet information includes at least one of TCP connection/release information, receive-completion information of a transmission packet, and error information of the receiving packet.

6. The hardware device of claim 4, wherein the message transmission command includes a protocol type, a command order ID, the number of data information, a transmission command type, and a socket ID, and at least one set of a transmission data upper-level address, a transmission lower-level address and a transmission data size.

7. The hardware device of claim 4, wherein the socket resource control command and the TCP connection/release command includes a command ID, a command order ID, the number of command arguments, a command type, a socket ID, and a command argument.

8. The hardware device of claim 4, wherein the socket resource control and TCP connection/release command storing means, the message transmission command storing means, and the transmission-standby socket ID storing means are connected to the transmission-only processor through a transmission-only processor local bus.

9. The hardware device of claim 8, wherein the timeout socket ID storing means, the received packet information storing means, and the socket information and packet information storing means are connected to the transmission-only processor through the transmission-only processor local bus and connected to the receipt-only processor through a receipt-only processor local bus.

10. A method for transmitting a network protocol packet, comprising:

storing socket resource control commands or transmission control protocol connection/release commands received from a host processor in a socket resource control and (TCP) connection/release command pool;

interpreting and processing socket resource control commands or transmission control protocol connection/release commands if the socket resource control commands or the transmission control protocol connection/release commands are stored in the socket resource control and (TCP) connection/release command pool;

storing message transmission commands based on corresponding network protocol of each socket into a message transmission command pool;

confirming necessary transmission resources by interpreting message transmission commands stored in the message transmission command pool;

segmenting the message transmission commands into segmented messages in a form of a network packet based on a corresponding network protocol if the message transmission commands are stored in the message transmission command pool;

reading data to be transmitted and creating a network protocol header for transmitting the data;

forming and transmitting a packet based on the created header and the read data;

interpreting and processing a network packet information if the network packet information is stored in the received packet information pool;

determining if network packet information is stored in a received packet information pool if the message transmission commands are not stored in the message transmission command pool; and interpreting and processing network packet information stored in the received packet information pool by processing TCP connection/release information, receive-completion information of a transmission packet, error information of a received packet and retransmission of the received packet if a receipt error arises wherein a transmission-only processor coupled to a transmission-only processor local bus such that the transmission-only processor communicates with the socket resource control and transmission control protocol (TCP) connection/release command storing means, with the message transmission command storing means, with the socket information and packet transmission information storing means, with the timeout socket ID storing means, and with the receiving packet information storing means, wherein the transmission-only processor for checking necessary transmission resources by interpreting message transmission commands stored in the message transmission command storing means, processing a message to be transmitted in a form of a network packet, reading data to be transmitted, creating a header, and storing socket information and packet transmission information in the socket information and packet transmission information storing means, and wherein a receipt-only processor coupled to a receipt-only processor local bus such that the receipt-only processor communicates with the timeout socket ID storing means, with the receiving packet information storing means, and with the socket information and packet transmission information storing means.

11. The method of claim 10, further comprising:
inspecting a transmission-standby socket ID pool for storing IDs of sockets having no media access control (MAC) address for transmitting the message transmission command and the TCP connection/release command;
obtaining a MAC address of a destination node through transmitting and receiving an address resolution protocol (ARP) packet if the transmission-standby socket ID pool includes an ID of a socket; and
transmitting a corresponding command which is a packet.

12. The method of claim 11, further comprising:
setting a timeout time; and
confirming a timeout type and transmitting a corresponding packet if an ID of a socket is stored in the timeout socket ID pool by a hardware logic that controls a timeout.

13. The method of claim 12, further comprising analyzing and processing corresponding information if a received packet information pool stores network packet information generated by a receipt-only processor.

14. The method of claim 13, wherein the network packet information includes at least one of TCP connection/release information, receive-completion information of a transmission packet, and error information of a received packet.

15. The method of claim 13, wherein the message transmission command includes a protocol type, a command order ID, the number of data information, a transmission command type, and a socket ID, and at least one set of a transmission data upper level address, a transmission data lower level address and a transmission data size.

16. The method of claim 13, wherein the socket resource control command and the TCP connection/release command includes a command ID, a command order ID, the number of command arguments, a command type, a socket ID, and a command argument.

17. A non-transitory computer readable recording medium having instructions that carry out a method for transmitting a network protocol packet, wherein the instructions of the computer readable recording medium comprising steps of:
storing socket resource control commands or transmission control protocol connection/release commands received from a host processor in a socket resource control and (TCP) connection/release command pool;
interpreting and processing socket resource control commands or transmission control protocol connection/release commands if the socket resource control commands or the transmission control protocol connection/release commands are stored in the socket resource control and (TCP) connection/release command pool;
storing message transmission commands based on corresponding network protocol of each socket into a message transmission command pool;
confirming necessary transmission resources by interpreting message transmission commands stored in the message transmission command pool;
segmenting the message transmission commands into segmented messages in a form of a network packet based on a corresponding network protocol if the message transmission commands are stored in the message transmission command pool;
reading data to be transmitted and creating a network protocol header for transmitting the data;
forming and transmitting a packet based on the created header and the read data;
interpreting and processing a network packet information if the network packet information is stored in the received packet information pool;
determining if network packet information is stored in a received packet information pool if the message transmission commands are not stored in the message transmission command pool; and
interpreting and processing network packet information stored in the received packet information pool by processing TCP connection/release information, receive-completion information of a transmission packet, error information of a received packet and retransmission of the received packet if a receipt error arises,
wherein a transmission-only processor coupled to a transmission-only processor local bus such that the transmission-only processor communicates with the socket resource control and transmission control protocol (TCP) connection/release command storing means, with the message transmission command storing means, with the socket information and packet transmission information storing means, with the timeout socket ID storing means, and with the receiving packet information storing means, wherein the transmission-only processor for checking necessary transmission resources by interpreting message transmission commands stored in the message transmission command storing means, processing a message to be transmitted in a form of a network packet, reading data to be transmitted, creating a header, and storing socket information and packet transmission information in the socket information and packet transmission information storing means, and wherein a receipt-only processor coupled to a receipt-only processor local bus such that the receipt-only processor communicates with the timeout socket ID storing means, with the receiving packet information storing means, and with the socket information and packet transmission information storing means.

18. The computer readable recording medium of claim 17, wherein the instructions of the computer readable recording medium further comprising:
inspecting a transmission-standby socket ID pool for storing IDs of sockets having no media access control (MAC) address for transmitting the message transmission command and the TCP connection/release command;
obtaining a MAC address of a destination node through transmitting and receiving an address resolution protocol (ARP) packet if the transmission-standby socket ID pool includes an ID of a socket; and
transmitting a corresponding command which is a packet.

19. The computer readable recording medium of claim 17, wherein the instructions of the computer readable recording medium further comprising:
   setting a timeout time; and
   confirming a timeout type and transmitting a corresponding packet if an ID of a socket is stored in the timeout socket ID pool by a hardware logic that controls a timeout.

20. The computer readable recording medium of claim 17, wherein the computer readable recording medium is selected from a group consisting of a read-only memory (ROM), a random-access memory (RAM), a CD-ROM, a magnetic tape, a floppy disk, and an optical data storage device.

* * * * *